United States Patent
Wright

(10) Patent No.: US 6,912,605 B1
(45) Date of Patent: Jun. 28, 2005

(54) METHOD AND/OR APPARATUS FOR IMPLEMENTING SECURITY IN KEYBOARD-COMPUTER COMMUNICATION

(75) Inventor: David G. Wright, Escondido, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 236 days.

(21) Appl. No.: 10/113,180

(22) Filed: Mar. 29, 2002

(51) Int. Cl.[7] .................................................. G06F 3/00
(52) U.S. Cl. .................. 710/60; 710/2; 710/58; 710/62; 710/65; 710/67; 713/501; 341/29
(58) Field of Search ................... 710/2, 58, 60, 710/62, 65, 67, 73; 713/202, 401, 501; 341/29

(56) References Cited

U.S. PATENT DOCUMENTS 6,509,845 B1 * 1/2003 Tanaka ........................ 341/22
6,567,016 B1 * 5/2003 Rajamani et al. ............. 341/24
6,640,268 B1 * 10/2003 Kumar ......................... 710/46
6,715,086 B1 * 3/2004 Himmel et al. .............. 713/202

OTHER PUBLICATIONS

"Timing Analysis of Keystrokes and Timing Attacks on SSH", By Dawn Xiaodong Song, et al., Aug. 13–17, 2001 (Proceedings of the 10th USENIX Security Symposium), pp. 337–352.

* cited by examiner

*Primary Examiner*—Jeffrey Gaffin
*Assistant Examiner*—Eron Sorrell
(74) *Attorney, Agent, or Firm*—Christopher P. Maiorana, PC

(57) ABSTRACT

A method for altering timing between transmissions of an input device comprising the steps of (A) receiving a plurality of inputs from the input device, (B) altering the timing between the inputs and (C) presenting the altered inputs in a potentially insecure environment.

20 Claims, 3 Drawing Sheets

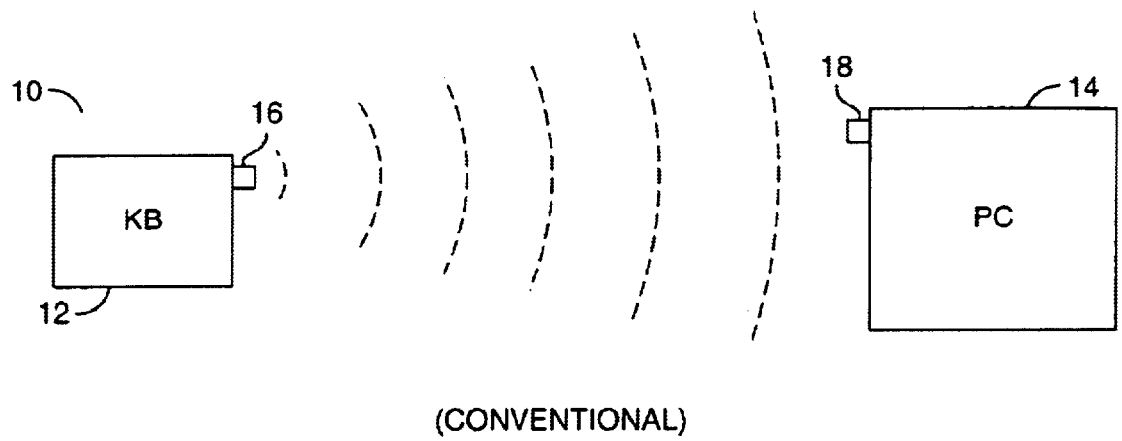
(CONVENTIONAL)
FIG. 1

METHOD AND/OR APPARATUS FOR IMPLEMENTING SECURITY IN KEYBOARD-COMPUTER COMMUNICATION

FIELD OF THE INVENTION

The present invention relates to security in a network environment generally and, more particularly, to method and/or apparatus for implementing security in keyboard-computer communications.

BACKGROUND OF THE INVENTION

Recent work (i.e., Timing Analysis of Keystrokes and Timing Attacks on SSH, published by Song, Wagner and Tian of the University of California, Berkeley, hereinafter "The Berkeley Article") has demonstrated the possibility to at least partially infer the content of encrypted keyboard keystroke data from inter-keystroke timing. Such inter-keystroke timing was found to be substantially constant between given key pairs. The Berkeley Article focused on the security of remote access over a wide area network (WAN) using secure shell (SSH) sessions. The Berkeley Article is concerned with security problems and solutions in WAN applications.

The UC Berkeley team demonstrated that they could reliably detect the length of passwords composed of randomly selected alpha-numeric characters. They also created an algorithm that ordered all possible character combinations for the given password length in probability order, with the correct password typically occurring in the top 1–2% of the list. The team found that inter-keystroke intervals typically varied between a high of 10s milliseconds and a low of hundreds of milliseconds (most being in the range 50–300 ms). Normal latency variations and polling intervals found in Universal Serial Bus (USB) keyboards, for example, will not sufficiently obscure inter-keystroke timing to provide a useful measure of security.

Referring to FIG. 1, a system 10 is shown illustrating a conventional wireless environment. The system 10 illustrates a keyboard 12 and a PC 14. The keyboard 12 has an emitter 16 that transmits signals that are received by a receiver 18. A typical wireless keyboard application in a personal computer (PC) environment is substantially more vulnerable to attack than the kind of WAN applications studied by the Berkeley team for one or more of the following reasons.

First, wireless keyboards typically encrypt the keystrokes that they send, but transmit particular new keystrokes immediately after they are detected. Wireless keyboards are not typically polled (i.e., periodically queried) because of power constraints.

Second, PC users do not typically use random passwords even for secure applications such as on-line banking. Rather, PC users typically use real words or combinations of real words. Searching the ranked probability list for key phrases (i.e., words, combinations of words, dates, etc.) would in many cases produce a manageably small list of candidate passwords.

Furthermore, even corporations do not typically require the use of random passwords by employees. Ease of memorization and a requirement to use both letters and numbers often results in passwords of the form "2easy2learn". This type of password "word" syntax could potentially be added to a real word search engine, further increasing vulnerability.

Wireless communications are much easier to intercept than WAN communications. Although typical applications have normal operating distances of a few feet, sophisticated receiving equipment could receive the signals several hundred feet away (i.e., in a parking lot outside a building, or on the street outside a house). The danger of interception being detected is therefore also dramatically reduced.

Vulnerability is magnified enormously when combined with vulnerability to eavesdropping equipment such as Tempest equipment. For example, a light truck could contain such eavesdropping equipment that can recreate and display everything displayed on a computer screen within a building from a nearby parking lot or street. The ability of such attacks to obtain password data has been limited because passwords are typically blocked out, often with asterisks. However, adding wireless keyboard interception may allow an eavesdropping attack to also reveal passwords.

While the results from Berkeley teams were based on a single interception, interceptions of multiple logons would be straightforward when combined with an eavesdropping attack. Such a combination could dramatically improve the effectiveness of the inference algorithm. Furthermore, the results in The Berkeley Article did not rely on a training session (i.e., a period of time in which the keystrokes of a user could be observed). A hardware-assisted attack could allow an algorithm to undertake a protracted learning period, substantially improving the accuracy of hidden keystroke inference.

Even without a hardware assisted attack, various other attacks are possible. Often the first thing typed after a period of keyboard inactivity will be a password or user ID and password. Therefore, attempting to infer the content of the first few keystrokes after a long gap would represent a powerful attack, especially if the user ID of a particular password were known, which is often the case.

As demonstrated, existing wireless keyboards can be vulnerable to a timing attack, laying users open to numerous types of fraud, loss of privacy, etc. As discussed, an unauthorized interception of the wireless transmission can introduce security vulnerabilities.

It would be desirable to implement a method and/or architecture for minimizing security risks of devices that are implemented in potentially vulnerable environments. The system may artificially alter (e.g., outside of transmission parameters of a particular transmission protocol) the timing between keystrokes to minimize unauthorized deciphering of passwords passed on the timing between keystrokes.

SUMMARY OF THE INVENTION

The present invention concerns a method for altering timing between transmissions of an input device comprising the steps of (A) receiving a plurality of inputs from the input device, (B) altering the timing between the inputs and (C) presenting the altered inputs in a potentially insecure environment.

The objects, features and advantages of the present invention include providing (i) resolution to security issues in Personal Area Network (PAN) applications, (ii) reduced vulnerability revealed in communications between a wireless keyboard and a host computer (including PDAs, etc.), (iii) a Human Interface Device (HID) which alters the timing of transmissions to obscure the timing of user interaction, (iv) a wireless keyboard that modifies the timing of keystroke transmissions beyond the timing which takes place as a result of normal wireless and firmware techniques such as polling loops, etc., (v) the introduction of dummy keystrokes into a keystroke sequence other than to convey hidden data, (vi) the deliberate delaying of a keystroke transmission in order to increase the probability to combine the keystroke with another keystroke in a single transmission, (vii) periodic transmission by a HID of data packets (regardless of whether or not any data is being transmitted) in order to obscure the timing of the transmission of data that is transmitted, (viii) the repeated starting and stopping of (v)–(vii), (ix) the repeated starting and stopping of (v)–(vii) in response to commands from a host computer, (x) the issuance by a computer of commands to a HID to start or stop altering the timings of transmissions in response to the sensitivity or insensitivity of data being transmitted by the HID, and/or (xi) an IC implementing parts of the approaches described by (v)–(ix), whether in firmware, in a state machine, or otherwise.

BRIEF DESCRIPTION OF THE DRAWINGS

These and other objects, features and advantages of the present invention will be apparent from the following detailed description and the appended claims and drawings in which:

FIG. 1 is a diagram of a conventional wireless keyboard;

DETAILED DESCRIPTION OF THE PREFERRED EMBODIMENTS

Figure 2:
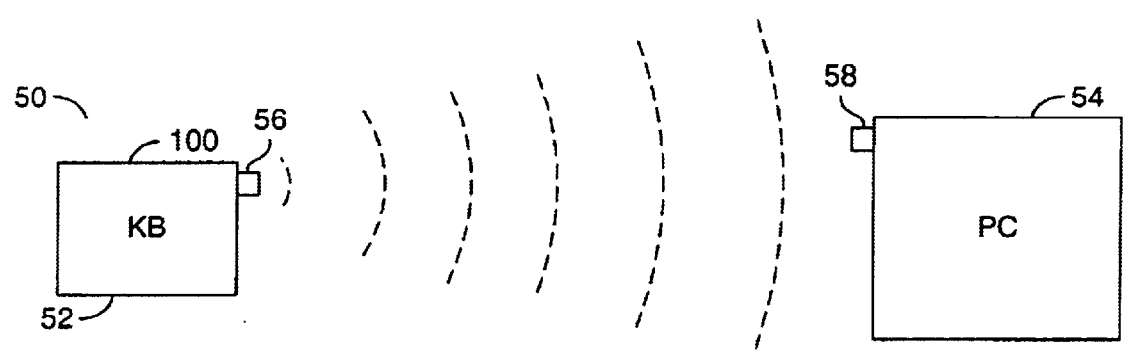
FIG. 2 is a diagram of an embodiment of the present invention implemented in the context of a wireless keyboard environment.

Referring to FIG. 2, a block diagram of a system 50 illustrating a context for a preferred embodiment of the present invention is shown. The system 50 is shown comprising a keyboard 52 and a personal computer (PC) 54. However, the present invention may be implemented in the context of any appropriate wireless communications system. The keyboard 52 has a transmitter 56 that transmits data that is generally received by a receiver 58 on the PC 54. A controller chip 100 generally stores instructions for executing the present invention. In one example, the controller chip 100 may be integrated within a standard keyboard controller chip. In another example, the controller chip 100 of the present invention may be implemented as a separate chip from the keyboard located between the keyboard and the transmitter 56. In a wired application (to be described in more detail in connection with FIGS. 4 and 5), the controller chip 100 may be hardwired between the keyboard and the PC 54.

Figure 3:
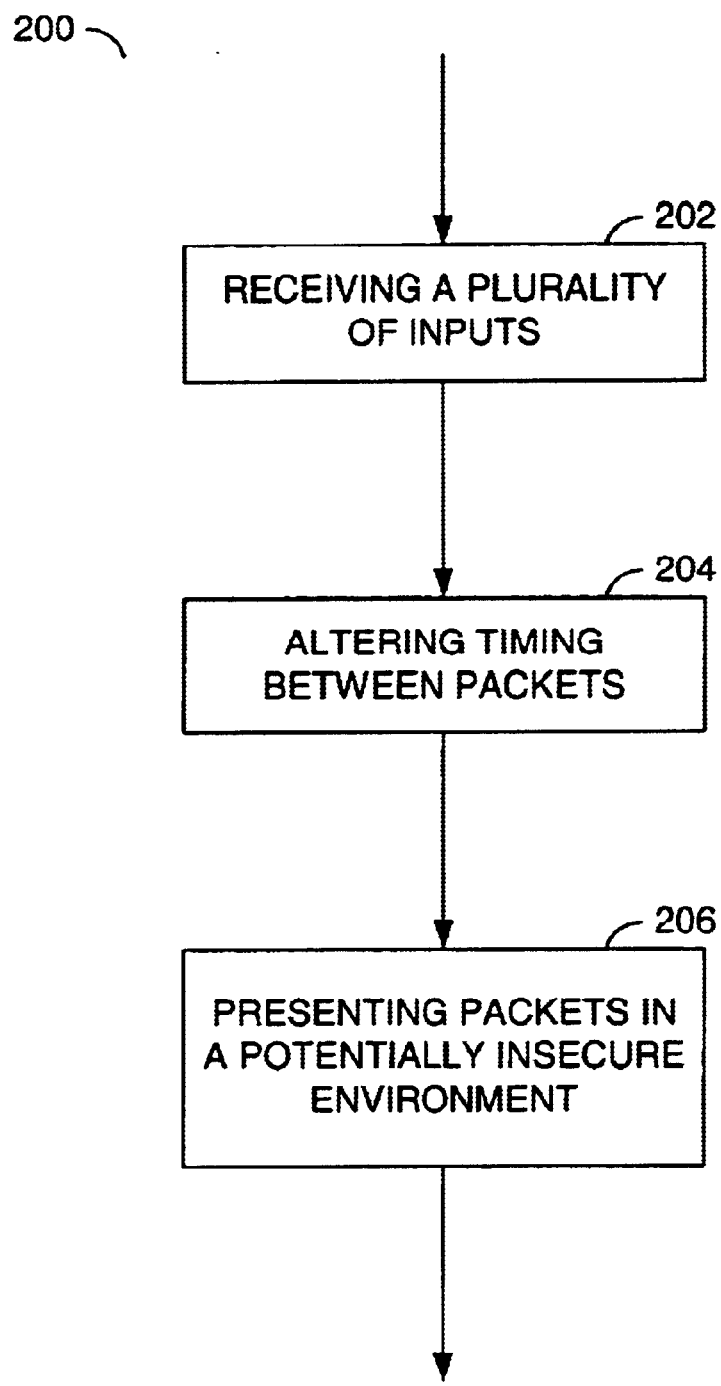
FIG. 3 is a flow diagram in accordance with the present invention.

Referring to FIG. 3, an example of a method (or process, routine, instruction set, etc.) 200 is shown in accordance with the present invention. The method generally comprises a state 202, a state 204 and a state 206. The state 202 is generally configured as a receiving gate for a plurality of inputs. The inputs, as discussed, may be packets (e.g., data that corresponds to keystrokes) received from a wireless keyboard and/or a wired keyboard in a Secure Shell (SSH) environment, or other appropriate environment. The state 202 generally presents the inputs to the state 204.

The state 204 generally alters the timing between the particular input packets. In one example, the state 204 may be configured to provide regular (e.g., equal) timing to the inputs (or packets). In another example, the state 204 may be configured to generate dummy packets (e.g., dummy keystrokes) that may be inserted between valid data inputs. The insertion of dummy packets may provide a continuous stream of regular (e.g., periodically timed) inputs. The period transmissions of data packets, regardless of whether or not data is being transmitted, may obscure the timing of the transmission of data (e.g., valid data) that is transmitted.

In another example, the state 204 may be configured to deliberately delay a keystroke input transmission such that there is a high probability that the delayed keystroke may be combined with another (e.g., successive) keystroke or keystrokes as a single input for transmission. The state 204 may be configured to insert a pause after each keystroke. A duration of the pause may be varied after each keystroke. The timing alteration (e.g., modification) implemented via the state 204 generally has a duration beyond the duration which takes place as a result of normal wireless transmissions and firmware techniques including polling loops.

The method 200 may be configured to implement the state 204 only at particularly vulnerable times (e.g., in response to the sensitivity of the data). In one example, the process 200 may be configured to activate/deactivate the state 204 in response to a host (e.g., the computer 54). However, the activation/deactivation of the state 204 may be implemented via any appropriate control to meet the design criteria of a particular application.

The state 204 may be configured to implement one or more of the timing alterations (e.g., regular transmissions, delayed transmissions and random transmissions) and/or dummy data packet transmissions. The state 204 generally presents the altered (e.g., modified) packets (inputs) to the state 206. The state 206 generally presents the altered inputs in a potentially insecure environment (e.g., an environment where the data may be intercepted). The state 206 generally presents the retimed packets to a wireless transmitter (e.g., the transmitter 56) or other device. The retimed packets presented by the state 206 are generally much more difficult to ascertain password or other confidential information from.

Figure 4:
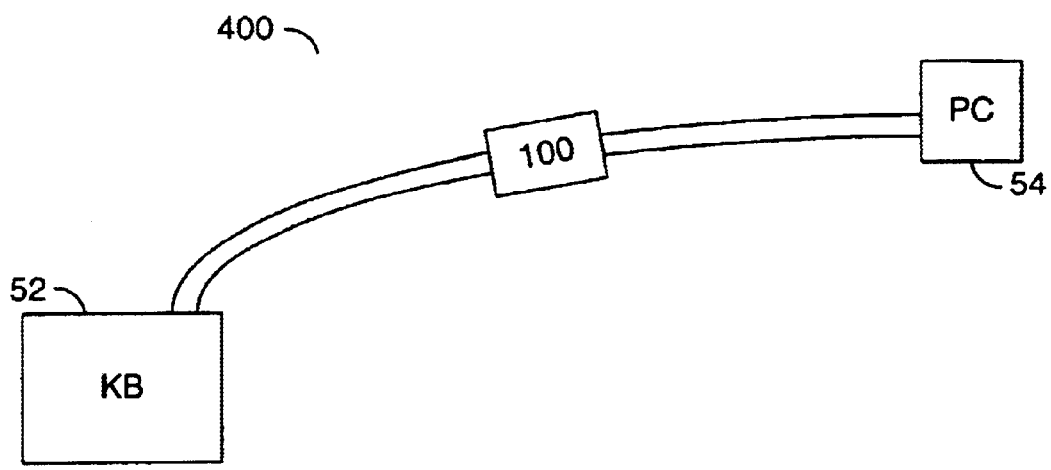
FIG. 4 is a diagram of an embodiment of the present invention implemented in a wired environment.
Figure 5:
FIG. 5 is a diagram of an alternate embodiment of the present invention.

Referring to FIG. 4, a diagram 400 illustrating the circuit 100 in connection with a wired application is shown. The circuit 100 is shown in line (e.g., serially coupled) between the keyboard 52 and the PC 54. Referring to FIG. 5, a diagram 500 illustrating the circuit 100 implemented as a controller chip on the keyboard 52 is shown. The circuit 100 may be implemented as a separate security chip or the circuit 100 may be implemented within the existing keyboard controller chip. In any event, the data presented by the keyboard 52 will generally have an altered timing between the various keystrokes such that ascertaining password information via interception is more difficult.

The circuit 100 (and/or the process 200) of the present invention may be configured to provide enhanced security in connection with wireless keystrokes (such as illustrated in FIG. 2) and/or wired keystrokes (such as illustrated in FIGS. 4 and 5). In this case, the security hole is more vulnerable in old-fashioned dial-up type sessions, where the PC is behaving like a remote dumb terminal (e.g., a VT220-style terminal).

The present invention may deliberately obscure inter-keystroke timing in order to improve security of transmitted data. The present invention provides a method and/or architecture configured to obscure inter-keystroke timing intervals to reduce the likelihood of and/or prevent successful timing attack, such as the attacks described in the background section.

At first glance, the cost and sophistication of a hardware assisted attack may only seem viable in a targeted attack on a corporation or very wealthy individual. However, such complacency may be mistaken. Any individual undertaking financial transactions on the web may quickly and easily be defrauded of thousands of dollars if the logon IDs and passwords were breached. In one example, a hardware assisted attack on an entire neighborhood may be perpetrated. Such an attack could gather IDs and passwords over a period of days or weeks, store them, and then perpetrate a mass fraud, perhaps from the relative safety of an overseas location.

Sales of wireless PC keyboards are of the order of 1 million units per year. This represents less than 1% of the total annual PC keyboard sales worldwide (e.g., approaching 200 million units). However, with the advent of the "Bluetooth" wireless PAN standard, and low-cost derivatives targeted specifically at keyboards and other Human Interface Devices (HIDs), wireless HID is volume is expected to rise dramatically in the near future. The increase is expected as a result of wireless HIDs taking additional market share in PC applications. A rise of new applications, such as keyboards for PDAs, internet appliances, game consoles, etc. is also expected. The present invention closes such security holes before they become widely known and exploited. The present invention may avoid any substantial slow down in the rate of adoption of wireless devices while improving security in the links between wireless keyboards and computers.

One concern with wireless applications is battery life. A typical wireless keyboard (e.g., the keyboard 12) spends the great majority of time in a "sleep" mode, consuming only a few micro amps ($\mu A$) of current. A Bluetooth compatible keyboard would need to wake up approximately every second and make a transmission in order to remain "registered" on the network. In wireless applications it is not practical to "poll" a keyboard continuously for data in the way that a USB host polls a USB keyboard every 8–10 ms.

Typically, the wireless keyboard is only awake when a key is pressed. The act of a key switch being executed typically wakes up the keyboard controller to a state that consumes several mA. Having computed the state of the key matrix, the controller will turn on a radio transmitter (e.g., the device 16) to transmit the new key state information. The transmission has current consumption of approximately 100 mA for approximately 1 ms (the actual transmission may take much less time than 1 ms, however, due 20 to protocol and other issues the radio transmitter 16 is generally active for longer than the actual transmission time).

Battery life (e.g., on 2 "AA" cells) of a typical wireless keyboard may be approximately 3 months with normal use. Substantially less battery life may be expected with heavy use. Such battery life is generally regarded as barely acceptable. Six months of battery life is the target generally regarded as being needed to avoid user annoyance.

The present invention (e.g., the circuit 100 and/or the method 200) generally provides a number of defenses that may be implemented either individually, or in combination. Depending on the level of security desired, the impact on battery life that is. acceptable, and/or the level of user intervention or inconvenience that is acceptable, one or more of the following aspects of the present invention may be implemented.

In one example, regular transmissions (e.g., transmissions at a substantially consistent or periodic rate) may be implemented as a defense in the context of the present invention. The circuit 100 may be configured to make a transmission regularly via the transmitter 56, regardless of whether or not any change in key state had taken place. Regular transmission will generally provide high security from timing attack in situations where encrypted transmissions representing a key state change are indistinguishable from encrypted transmissions representing no change.

However, continuous repetitive transmission at a regular rate may reduce battery life to a few hundred hours, which may be unacceptable to some users. However, a few hundred hours of active use, which in many cases may be months of calendar time, may be generally acceptable. Therefore, regular transmission is likely to be a viable implementation of the present invention if the circuit 100 is configured to turn off regular transmission during periods of inactivity.

Furthermore, delays between keystrokes may be implemented via the present invention (e.g., the state 204). The maximum period without the user becoming aware of keystroke delays is generally approximately 30–100 ms. Past empirical research indicates that computer game applications are the most demanding in this regard, followed closely by highly proficient touch typists. Normal office and less demanding home users typically withstand delays of up to 100 ms without complaint.

In one example, an ON/OFF switch may be implemented to control power to the keyboard 52 and/or the circuit 100. The user will generally turn the keyboard off when it is not in use. While beneficial for battery savings, such an approach would be unlikely to gain user acceptance. However, an ON/OFF switch may be appropriate for particular design implementations.

In another example, a timeout (TO) power down may also be implemented. After a predetermined period of inactivity, the keyboard 52 may be configured to cease regular transmissions. The timeout may be implemented after inactivity of 1 second or less. The timeout inactivity interval may be varied to meet the design criteria of a particular implementation. For example, inactivity periods between 1 and 10 seconds may be used. Such an approach may provide a good compromise between battery life and security in most applications.

In yet another example, phased security (PS) may also be implemented. For example, after a resumption of activity after a predetermined period of inactivity, regular transmissions may be made until a certain number of keystrokes have taken place. Such an approach may provide protection from one of the simplest attacks, at negligible cost in terms of battery life. The phased security approach may be extended to defend against other specific attacks. A determination of the conditions that may imply a password was being typed may be implemented (e.g., similar to how an attacker would work). The repetitious regular transmission defense may be implemented during conditions that imply a password is being typed to save battery life.

In yet another example, a transmission delay defense (TDD) may also be implemented. As noted, delays of up to 30–100 ms in transmissions of key state may be acceptable. The quality of the timing data available to an attacker may be substantially degraded if random delays are introduced between detection of the state change and transmission.

However, the transmission delay defense may offer limited protection since it reduces, rather than eliminates, the timing data available to an attacker. In particular, an attacker able to observe many secure events may be able to average out the added random delays. However, the transmission delay defense may be enhanced by biasing the delays to the long side of the acceptable range. The delay may then be used to combine the initial state change with another state change, and transmitting both (e.g., two or possibly more consecutive keystrokes) in a single transmission. The transmission delay defense may be further enhanced by adding dummy keystrokes (e.g., keystrokes that mimic regular keystrokes to a potential attacker, yet do not actually carry keyboard data). Dummy keystrokes may be inserted randomly between real keystrokes either continually (e.g., randomly, but on average about every 10 keystrokes), or by implementing some and/or all of the noted timing methods (e.g., in combination with the proposed regular transmission defense).

The more sophisticated variants and combinations of the transmission delay defense of the present invention may offer substantial protection from attack at negligible cost in battery life. It is unlikely that an effective attack could succeed without information in addition to the information which could be obtained by eavesdropping only on the wireless link.

A host assisted defense (HAD) may also be implemented via the present invention. Regular transmission may be a substantially secure defense. However, regular transmission may, in some cases, result in substantial costs in battery life. If the keyboard control (and/or the circuit 100) were provided more information corresponding to the meaning of the keystrokes, the host assisted defense may be implemented only when needed. The effect on battery life may be reduced to a negligible level.

In most cases, the host computer is configured to respond appropriately when the data being entered is of a secure nature (e.g., the data may be sensitive). The Operating System (OS) is generally configured to respond appropriately when data about to be entered will fill an OS, application or network login and password field. In the case of passwords, the OS is generally configured to asterisk out passwords.

Increasingly the same is true of passwords entered on websites. As a result of "XML" tags identifying the type of information to be entered and allowing a web browser to "autocomplete" fields, websites generally respond appropriately to login ID and password entries. An alternative strategy that may be implemented via the present invention is to presume that any data entered into a field on a secure website is sensitive. The operating system may transmit a command to the keyboard and configure the operating system in a secure mode for the duration of a secure transaction. The power consumption overhead cost of the highest security would therefore only be borne when needed.

While many of the defenses described may be implemented entirely within the keyboard 52, the host assisted defense may be implemented via an alteration and/or addition to software running on the PC 54. Clearly the most secure outcome would be if operating system and browser vendors were to be persuaded to implement the necessary features required to implement the defense of the present invention. Keyboards may then be configured to implement the transmission delay defense normally, and the regular transmission defense during times when secure data was being entered. Such a combination of defenses may provide a high level of resistance to a timing-based attack, even when hardware-assisted.

The present invention may provide security for users of wireless keyboards, providing password protection and protection of other data from even the most sophisticated eavesdropping. Although the description of the present invention focuses on wireless keyboards, the invention is equally applicable to any keyboard (e.g., as described in connection with FIGS. 4 and 5). For example, the timing of ordinary (e.g., USB) keyboard to computer communications may be detectable by a Tempest-like eavesdropper. In the case of a USB keyboard, even if an eavesdropper were able to detect the difference between a data packet and a NAK packet, the present invention may provide an effective defense. In one implementation, the present invention may have a possible minor non-compliance with the USB spec (e.g., not NAKing on no state change).

Although the description of the present invention is directed to communications between a keyboard (e.g., the keyboard 52) and a "computer" or PC (e.g., the computer 54), the invention is generally applicable to all communications between a keyboard and devices receiving data from such a device. In some cases, devices that are not themselves keyboards may emulate the function of a keyboard in response to user stimulation (e.g., a virtual keyboard). To the extent that the timing of the user intervention may be embedded in the timing of the transmissions of the virtual keyboard, the present invention may be applied to disguise such timing.

While the present invention has been described in connection with keyboards, other Human Interface Devices (HIDs) may be used to transmit sensitive data to other devices such as PCs. The invention may be applied to protect transmission of any data from any HID to another device. By closing a hole in the security of keyboard-host communications the present invention may remove a threat to the growth of that target market.

While the invention has been particularly shown and described with reference to the preferred embodiments thereof, it will be understood by those skilled in the art that various changes in form and details may be made without departing from the spirit and scope of the invention.

What is claimed is:

1. A method for altering timing between transmissions of a wireless input device of a personal computer (PC) comprising the steps of:
   (A) receiving a plurality of inputs from said wireless input device, wherein each of said inputs are separated by one of a plurality of inter-keystroke timing intervals;
   (B) altering the timing between said inputs to obscure said inter-keystroke timing intervals and enhance security of said wireless input device; and
   (C) presenting said altered inputs to said personal computer through a wireless environment.

2. The method according to claim 1, wherein said input device comprises a human interface device (HID).

3. The method according to claim 1, wherein step (B) comprises altering the inter-keystroke timing intervals between each of said inputs.

4. The method according to claim 1, wherein said wireless input device comprises a wireless keyboard configured to modify timing of keystroke transmissions in addition to normal wireless transmissions and firmware security techniques.

5. The method according to claim 1, further comprising the steps of:
   introducing dummy keystrokes into a keystroke sequence, wherein said dummy keystrokes convey other than hidden data.

6. The method according to claim 1, wherein step (B) comprises:

deliberately delaying a keystroke transmission to increase the probability that the delayed keystroke is combined with another keystroke as a single transmission.

7. The method according to claim 1, further comprising: periodically transmitting data packets regardless of whether or not data is being transmitted, wherein said periodic transmission obscures the timing of the transmission of data that is transmitted.

8. The method according to claim 1, further comprising: starting and stopping said method in accordance with predetermined criteria.

9. The method according to claim 1, further comprising: starting and stopping said method in response to commands from a host computer.

10. The method according to claim 1, further comprising: issuing by a computer commands to a human interface device (HID) to start or stop altering the timings of transmissions in response to the sensitivity or insensitivity of data being transmitted by the HID.

11. The method according to claim 1, further comprising: inserting a pause after each keystroke.

12. The method according to claim 11, wherein said pause is varied after each keystroke.

13. The method according to claim 1, wherein said step (B) is activated only at particularly vulnerable times.

14. The method according to claim 13, wherein a host activates/deactivates step (B).

15. An apparatus comprising:
a wireless input device of a personal computer (PC) configured to (i) receive a plurality of inputs each separated by one of a plurality of inter-keystroke timing intervals, (ii) alter timing between said inputs to obscure said inter-keystroke timing intervals and enhance security of said wireless input device, and (iii) present said altered inputs to said personal computer through a wireless environment.

16. The apparatus according to claim 15, wherein said device is further configured to generate one or more dummy keystrokes and present said dummy keystrokes at random intervals.

17. The apparatus according to claim 15, wherein said device is configured to alter said timing such that said timing altered inputs are presented at regular intervals.

18. The apparatus according to claim 15, wherein said device is only activated at particularly vulnerable times.

19. The apparatus according to claim 15, wherein said device is implemented in an integrated circuit selected from the group consisting of firmware and a state machine.

20. An apparatus for altering timing between transmissions of a wireless input device of a personal computer (PC) comprising:
means for receiving a plurality of inputs from said wireless input device, wherein each of said inputs are separated by one of a plurality of inter-keystroke timing intervals;
means for altering timing between said inputs to obscure inter-keystroke timing intervals and enhance security of said wireless input device; and
means for presenting said altered inputs to said personal computer through a wireless environment.

* * * * *